United States Patent [19]

Danley et al.

[11] Patent Number: 5,144,122
[45] Date of Patent: Sep. 1, 1992

[54] SCANNING RADIATION SENSOR WITH AUTOMATIC FOCUS CONTROL FOR OPTIMAL FOCUS AND METHOD

[75] Inventors: William J. Danley, Highland Park; Jeffrey M. Kresch, Gurnee; Eugene F. Kalley, St. Charles, all of Ill.

[73] Assignee: Square D Company, Palatine, Ill.

[21] Appl. No.: 601,481

[22] Filed: Oct. 19, 1990

[51] Int. Cl.⁵ .............................................. G01J 1/20
[52] U.S. Cl. .................................. 250/201.2; 250/234
[58] Field of Search ................... 250/201.2, 234, 347, 250/348; 356/1, 4

[56] References Cited

U.S. PATENT DOCUMENTS 4,577,095  3/1986  Watanabe ........................ 250/201.2
4,746,790  5/1988  Sorimachi ....................... 250/201.2

Primary Examiner—David C. Nelms
Assistant Examiner—T. Davenport
Attorney, Agent, or Firm—Michael J. Femal; James W. Potthast

[57] ABSTRACT

A scanning radiation sensor (10) automatically focuses a focusable optical system (26) based on the closest distance (C) and the farthest distance (F) of the optical system (26) from a target (12) through means of a focusing controller (44), motor driver (42) and focus motor (40) to obtain an optimum focus for all points along a line between the farthest point (f) and closest point (c).

21 Claims, 1 Drawing Sheet

SCANNING RADIATION SENSOR WITH AUTOMATIC FOCUS CONTROL FOR OPTIMAL FOCUS AND METHOD

BACKGROUND OF THE INVENTION

This invention generally relates to a scanning radiation sensor and, particularly, to such a sensor with a means for varying the focus of the sensor.

Scanning infrared sensors of the type which collect exitance from a plurality of points along a line on a target and convert the collected radiation, such as infrared light, to a representation of temperature are well known. The collection of light from the plurality of points is achieved by means of a scanning optical system including a rotating scanning mirror which radially sweeps the target and directs the collected radiation to a focus adjustable lens system interposed between the scanning mirror and an infrared detector. The infrared detector converts the collected radiation to an electrical signal which is then converted to a representation of temperature.

Ideally, the scanning optical system focus should be set to minimize the largest size of the optical resolution for all spots along the portions of the scan line where temperatures are to be measured. There are two types of optical resolution: angular resolution and dimensional resolution. Angular resolution is defined as the ratio of spot size and distance to the scanner optics and is expressed in milliradians. Dimensional resolution is defined as the maximum spot area along the scan line and is expressed in square inches.

A difficulty with known scanning radiation sensors is that most targets are not interior cylindrical surfaces, but are generally flat. Accordingly, even though the focal length of the optical system remains constant during the scan, because the distance between the lens and the spots on the target vary, the resolution varies along the scan line on the target.

In known radiation scanners, this problem has been approached by providing a manually adjustable or manually controlled optical system to enable the operator to selectively focus on any point of the scan line. Some users manually set the focus to minimize the largest angular resolution. Specifically, it is known to minimize the largest angular resolution for all spots measured by calibrating the optimum focusing distance $D_f$ for a certain perpendicular object distance $D_o$ through of the formula $D_f = 2D_o/(1+\cos \alpha)$, where $\alpha =$ the instantaneous scan angle, $D_o$ equals object distance and $D_f$ equals focusing distance.

However, such formulas are difficult for operators to deal with even when reduced to graphs or tables of different focal settings for different parameters.

SUMMARY OF THE INVENTION

It is therefore a principal object of the present invention to provide a scanning radiation sensor and method which overcomes the aforementioned problems through provision of means for automatically adjusting the focus of the optical system for optimal resolution determined automatically in accordance with simple distance measurement data.

Specifically, it is an objective to provide a scanning radiation sensor having a scanning optical system for collecting exitance from selected spots located on a target at different distances from the optical system, a detector for converting the collected exitance into an electrical signal for each spot and means for converting the electrical signal into a representation of radiation of the selected spots, with means for receiving an input representative of the distance from the optical system to the selected spot on the target closest to the optical system, means for receiving an input representative of the distance from the optical system to the selected spot on the target farthest from the optical system, means responsive to said inputs representative of the farthest and closest distance for automatically determining an optimal focus setting for the scanning optical system, and means responsive to said optimal focus automatically determining means to automatically adjust the focus of the scanning optical system to said optimal focus setting.

It is therefore also an objective to provide a scanning radiation sensor having a scanning optical system for collecting exitance from selected spots on a target at different distances from the optical system, a detector for converting the collected exitance into an electrical signal for each spot and means for converting the electrical signal into a representation of radiation of the selected spots, a method for obtaining an optimal focus of the optical system to minimize the largest resolution for all of the spots. The method comprises the steps of (1) determining the closest distance from the optical system to the closest selected spot on the target, (2) determining the farthest distance from the optical system to the farthest selected spot on the target, (3) automatically determining the optimal focus setting for the scanning optical system to achieve the minimum best resolution for all the selected spots based on said farthest and closest distances, and (4) automatically adjusting the focus of the scanning optical system to said optimal focus setting.

BRIEF DESCRIPTION OF THE DRAWING

The foregoing objects and advantageous of the invention will be explained in greater detail and others will be made apparent from the detailed description of the preferred embodiment of the present invention which is given with reference to the several figures of the drawing, in which.

DESCRIPTION OF THE PREFERRED EMBODIMENT

Figure 1:
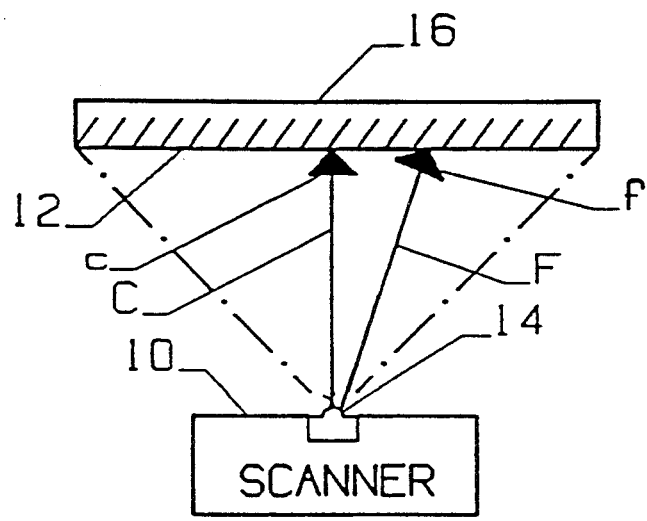
FIG. 1 is a schematic illustration of the scanning radiation sensor in position to scan a planar target.

Referring to FIG. 1, a preferred embodiment of the scanning radiation sensor, or sensor 10 of the present invention is seen as scanning a target 12, such as a piece of extruded metal, plastic or glass. The optical system 14 has a lens (not shown) which is a distance F from the farthest spot f on the target 12 from which radiation is to be sensed. The lens is also a distance C from the closest spot c on the target 12 from which radiation is to be sensed. The scanner 10 is capable of scanning a greater portion of the target 12 than that between the closest and farthest spots c and f. With regard to the points between the spots c and f, the scanner chooses all, or only selected ones, of samples from which to determine temperature.

Figure 2:
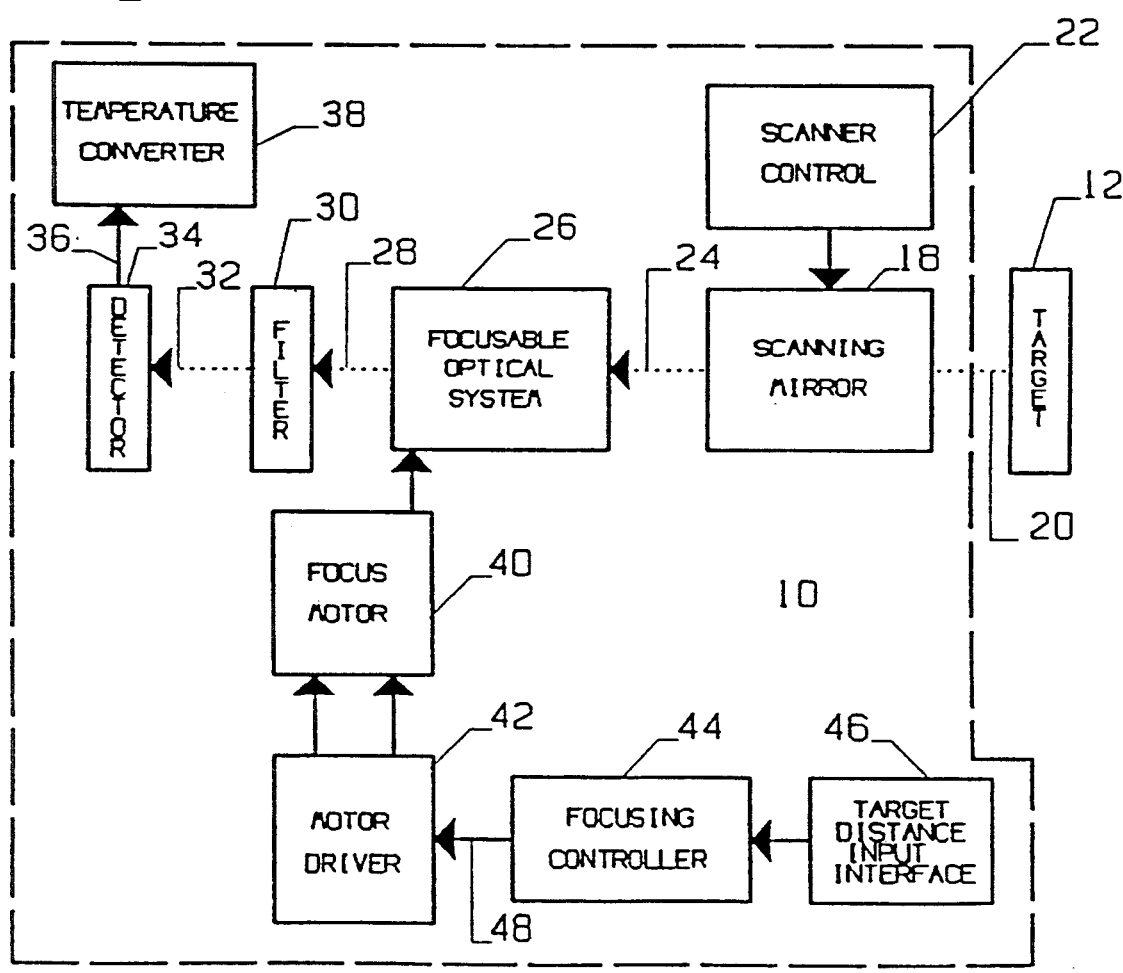
FIG. 2 is a functional block diagram of a preferred embodiment of the scanning radiation sensor of the present invention.

Referring to FIG. 2 the scanner 10, includes a scanning mirror 18 which receives radiation from the target 12 along a radially moving path 20 which scans between the closest spot c and the farthest spot f. A scanner control 22 maintains a constant speed of rotation of the scanning mirror 18 in a range between ten and fifty resolutions per second.

The radiation from the scanning mirror 18 passes the radiation along a path 24 to a focusable optical system 26 which includes a lens (not shown) which is adjustable with respect to the distance between the lens and the target 12. The focusable optical system 26 passes the radiation along a path 28 to a filter 30 which filters out radiation of wavelength of radiation other than the infrared wavelengths of interest. The filter, in turn, passes the radiation along a path 32 to a detector, or detector circuit, 34 including a photoresponsive semiconductor and, preferably, a preamplifier. The photoresponsive semiconductor converts the radiation to an analog signal that is amplified by the preamplifier and then provided on output 36 which is coupled to a temperature convertor 38. The temperature convertor 38 converts the signal at output 36 to an indication of temperature of the entire line between the closest spot c and the farthest spot f or selected segments of that line.

The principal objective of the invention is achieved through means of a focus motor 40, a motor driver 42, a focusing controller 44 and a target distance input interface circuit 46. The focusing controller 44 responds to two inputs from the target distance input interface 46: an input representing the closest distance c and an input representing the farthest distance F. Based on these two inputs, the focusing controller 44 determines the optical focus setting for the focusable optical system 26 and passes the optical focus information to the motor driver 42 on an output 48. The motor driver 42 responds to the focusing controller 44 to produce signals on an output 48 to the focusing motor 40. The focus motor 40 accordingly responds to the signals on output 48 to automatically adjust the focusable optical system 26 to the proper focus.

Preferably, the focusing controller 44 includes a microprocessor (not shown) which calculates the best optical focal distance, or focus setting, for minimizing the maximum angular resolution of all spots measured by dividing twice the product of the farthest and closest distance from the optical system by the sum of the farthest distance F and the closest distance C from optical system 26 via path 24, scanning mirror 18 and path 20. Preferably, distance inputs are provided manually, although they could also be provided by a range finder or other device.

Alternatively, the calculation should produce the best optical focal distance for a portion of the line segment on the target defined by the spots c and f. This best focal distance minimizes the maximum dimensional resolution for all the selected spots between c and f. This is preferably achieved through use of an algorithm for optimal focus B defined by the equation:

$$B = \frac{(F + C)D}{2D - (F - C)O_R}, \text{ for } FO_R < D$$
$$= F, \text{ for } FO_R \geq D$$

where
F = the distance from the lens to the farthest spot;
C = the distance from the lens to the closest spot;
D = the lens aperture diameter; and $O_R$ = the optical resolution, i.e. the spot diameter/distance from the lens to the spot, at the focal distance.

While the apparatus shown and described with reference to FIG. 2 is preferred, it should be appreciated that the invention is not limited to such apparatus. Generally, a method for obtaining optimal focus is achieved for setting an optimal focus of an optical system to minimize the largest optical resolution for all spots in a scanning radiation sensor comprising the steps of (1) determining the closest distance from the optical system to the closest selected spot on the target, (2) determining the farthest distance from the optical system to the farthest selected spot, (3) automatically determining the optimal focus setting for the scanning optical system to minimize the maximum optical resolution for all the selected spots based on said farthest and closest distances, and (4) automatically adjusting the focus of the scanning optical system to said optimal focus setting.

While the various components of the scanning radiation sensor 10 have been described functionally above and the details of their construction do not form a part of this invention, if details of the structure, relative locations and general operation of the scanner 10 are desired, reference should be made to U.S. patent Ser. No. 07/600,638 of Sam Paris entitled "Scanning Radiation Sensor With Movable Baffle Assembly and Method of Sensing", filed on Oct. 19, 1990, contemporaneously herewith, and which has been assigned to the assignee of this application.

While a detailed description of the preferred embodiment of the invention has been given, it should be appreciated that many variations can be made thereto without departing from the scope of the invention as set forth in the appended claims. For instance, the detector circuit 34 could comprise a linear or area infrared detector array upon which the radiation is focused. The formula for optical focus B is preferred, but clearly other formulae which are substantially similar to the formula here or which give substantially the same result within the variables of the above system could be used and still obtain the benefits of the invention.

We claim:
1. In a scanning radiation sensor having a scanning optical system for collecting exitance from selected spots located on a target, a detector for converting the collected exitance into an electrical signal for each spot and means for converting the electrical signal into a representation of radiation of the selected spots, the improvement being an apparatus for automatically obtaining an optimal focus of the optical system to minimize the largest resolution for said spots, comprising:
  means for receiving an input representative of the distance from the optical system to the selected spot on the target closest to the optical system;
  means for receiving an input representative of the distance from the optical system to the selected spot on the target farthest from the optical system;
  means responsive to said inputs representative of the farthest and closest distance for automatically determining an optimal focus setting for the scanning optical system; and
  means responsive to said optimal focus automatically determining means to automatically adjust the focus of the scanning optical system to said optimal focus setting.

2. The scanning radiation sensor of claim 1 in which said automatically adjusting means includes means for automatically adjusting the distance between a lens of the optical system and the detector.

3. The scanning radiation sensor of claim 1 in which said optimal focus determining means calculates the optimal focal distance by dividing twice the product of the farthest and closest distance from the optical system to the target by the sum of the farthest and closest distance from the optical system to the target to create the best angular resolution for a point on a line defined by the spots of furthest and closest distance.

4. The scanning radiation sensor of claim 1 in which the optimal focus determining means includes means for computing the optimal angular resolution for the selected spots.

5. The scanning radiation sensor of claim 1 in which the optimal focus determining means includes means for computing the optimal dimensional resolution for selected spots.

6. The scanning radiation sensor of claim 1 in which said inputs responsive means includes means for determining the optimal focus, B, for the best dimensional optical resolution through use of an algorithm defined by the equation:

$$B = \frac{(F + C)D}{2D - (F - C)O_R}, \text{ for } FO_R < D$$
$$= F, \text{ for } FO_R \geq D$$

where
$F$ = the distance from the lens to the farthest spot;
$C$ = the distance from the lens to the closest spot;
$D$ = the lens aperture diameter; and
$O_R$ = the optical resolution, i.e. the spot diameter/distance from the lens to the spot, at the focal distance.

7. The scanning radiation sensor of claim 1 in which the optimal focus determining means includes means for minimizing the maximum optimal angular resolution for the selected spots.

8. The scanning radiation sensor of claim 1 in which the optimal focus determining means includes means for minimizing the maximum dimensional resolution for the selected spots.

9. The scanning radiation sensor of claim 1 including means responsive to representation of radiation of a selected spot to determine its temperature.

10. The scanning radiation sensor of claim 1 in which said selected spots are arranged along a line.

11. The scanning radiation sensor of claim 10 in which said spots are contiguous to form a continuous line.

12. The scanning radiation sensor of claim 1 in which each spot comprises a plurality of points on a line.

13. In a scanning radiation sensor having a scanning optical system for collecting exitance from selected spots on a target, a detector for converting the collected exitance into an electrical signal for each spot and means for converting the electrical signal into a representation of radiation of the selected spots, a method for obtaining an optimal focus of the optical system to minimize the largest resolution for all of the spots, comprising the steps of:

determining the closest distance from the optical system to the closest selected spot on the target;
determining the farthest distance from the optical system to the farthest selected spot;
automatically determining the optimal focus setting for the scanning optical system to achieve the minimum largest resolution for all the selected spots based on said farthest and closest distances; and
automatically adjusting the focus of the scanning optical system to said optimal focus setting.

14. The method of claim 13 in which said step of determining the optimal focus setting includes the steps of
multiplying the closest distance and farthest distance to determine a distance product,
adding the farthest distance and closest distance to determine a distance sum, and
dividing twice the distance product by the distance sum.

15. The method of claim 13 in which step of determining the optimal focus includes computing the optimal average angular resolution for all the selected spots.

16. The method of claim 13 in which the step of determining the optimal focus includes the step of computing the optimal average dimensional resolution for all of the selected spots.

17. The method of claim 13 in which said step of determining the optimal focus, B, for the best dimensional resolution is achieved through use of an algorithm defined by the equation:

$$B = \frac{(F + C)D}{2D - (F - C)O_R}, \text{ for } FO_R < D$$
$$= F, \text{ for } FO_R \geq D$$

where
$F$ = the distance from the lens to the farthest spot;
$C$ = the distance from the lens to the closest spot;
$D$ = the lens aperture diameter; and
$O_R$ = the optical resolution, i.e. the spot diameter/distance from the lens to the spot, at the focal distance.

18. The method of claim 13 in which said step of determining the optimal focus includes means for minimizing the average maximum dimensional resolution for all the selected spots.

19. The method of claim 13 including the step of converting the representations of radiation to indications of temperatures.

20. The method of claim 13 including the step of arranging said spots on a line concurrent with a scanning sensing line of the sensor.

21. The method of claim 11 including the step of arranging said spots in contiguous interrelationship to form a continuous line.

* * * * *